(12) United States Patent
Park et al.

(10) Patent No.: US 12,333,584 B2
(45) Date of Patent: Jun. 17, 2025

(54) SYSTEM AND METHOD FOR PROVIDING TAXI SERVICE

(71) Applicants: Hyundai Motor Company, Seoul (KR); Kia Corporation, Seoul (KR)

(72) Inventors: Yunjoong Park, Seoul (KR); Jeongtaek Oh, Yongin-si (KR); Byeonghwi Choi, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 87 days.

(21) Appl. No.: 17/958,645

(22) Filed: Oct. 3, 2022

(65) Prior Publication Data
US 2023/0410163 A1    Dec. 21, 2023

(30) Foreign Application Priority Data

May 20, 2022   (KR) .......................... 10-2022-0062236

(51) Int. Cl.
*G06Q 10/02*   (2012.01)
*G06Q 30/0283*   (2023.01)
(Continued)

(52) U.S. Cl.
CPC ......... *G06Q 30/0284* (2013.01); *G06Q 10/02* (2013.01); *G06Q 50/47* (2024.01); *G07C 5/008* (2013.01); *G08G 1/202* (2013.01)

(58) Field of Classification Search
USPC ........................................................ 705/13
See application file for complete search history.

(56) References Cited

U.S. PATENT DOCUMENTS

2012/0109796 A1\* 5/2012 Mashal ................. G06Q 30/04
 705/34
2020/0168008 A1\* 5/2020 Kuncl ................ G01C 21/3407
(Continued)

FOREIGN PATENT DOCUMENTS

KR         101344816 B1    12/2013
KR        20160131530 A    11/2016
(Continued)

OTHER PUBLICATIONS

Fielbaum, Andres, et al.; "On-demand ridesharing with optimized pick-up and drop-off walking locations"; Transportation Research Part C: Emerging Technologies; vol. 126, May 2021; https://www.sciencedirect.com/science/article/pii/S0968090X21000887; May 2021. (Year: 2021).\*

*Primary Examiner* — Dione N. Simpson
(74) *Attorney, Agent, or Firm* — SLATER MATSIL, LLP

(57) ABSTRACT

In one embodiment, a system can be used for providing a taxi service. The system includes an integrated terminal configured to communicate with an operating server that provides a response to a request for a service received from a user terminal through a network. The integrated terminal is configured to determine whether to identify vehicle distribution call information by using an operation state of a vehicle and information acquired by associating a boarding location of a user and heading direction information of the vehicle, calculate an operation fee by using GPS information or wheel speed information of the vehicle, and determine whether an output screen of the vehicle is changed based on gear state information, wheel speed information, or information received from an electronic control unit of the vehicle.

7 Claims, 9 Drawing Sheets

(51) Int. Cl.
*G06Q 50/47* (2024.01)
*G07C 5/00* (2006.01)
*G08G 1/00* (2006.01)

(56) References Cited

U.S. PATENT DOCUMENTS

2020/0398867 A1\* 12/2020 Hara ..................... B60W 30/09
2021/0217313 A1\* 7/2021 Hirose ............... G01C 21/3446

FOREIGN PATENT DOCUMENTS

| KR | 20170041480 A | 4/2017 | |
|---|---|---|---|
| KR | 101975479 B1 | 4/2019 | |
| WO | WO-2020071645 A1 \* | 4/2020 | ........... B60R 16/023 |

\* cited by examiner

SYSTEM AND METHOD FOR PROVIDING TAXI SERVICE

CROSS-REFERENCE TO RELATED APPLICATIONS

This application claims priority to and the benefit of Korean Patent Application No. 10-2022-0062236 filed in the Korean Intellectual Property Office on May 20, 2022, the entire contents of which are incorporated herein by reference.

TECHNICAL FIELD

The present disclosure relates to a system and a method for providing a taxi service.

BACKGROUND

In order for a driver of a vehicle to provide a taxi service in the related art, a scheme should be used, in which the driver had to purchase a separate device with software on taxi services for each function and install and link the separate device in the vehicle.

In the case of such a scheme, data by various devices and sensors embedded in the vehicle cannot be utilized, and there is a problem due to low integrity and connectivity according to mounting of hardware for each function.

Therefore, there is a need for development of a terminal that can integrally use a taxi related service function.

The above information disclosed in this Background section is only for enhancement of understanding of the background of the invention, and therefore it may contain information that does not form the prior art that is already known in this country to a person of ordinary skill in the art.

SUMMARY

The present disclosure has been made in an effort to provide a system and a method for providing a taxi service which can determine whether to transmit vehicle distribution call information by considering an operation state, of a vehicle, a boarding location of a user, and a heading direction of the vehicle.

The present disclosure has been made in an effort to provide a system and a method for providing a taxi service which can calculate an operation fee by using information received from a GPS or a sensor device of the vehicle.

The present disclosure has been made in an effort to provide a system and a method for providing a taxi service which can change an output screen of the vehicle by considering a gear state and guide an additional path by considering a battery charge state of the vehicle.

The present disclosure has been made in an effort to provide a system and a method for providing a taxi service which can store motor revolution per minute (RPM) information as an operation history.

The present disclosure has been made in an effort to provide a system and a method for providing a taxi service which includes an integrated terminal for providing the taxi service to the vehicle.

An exemplary embodiment of the present disclosure provides a system for providing a taxi service, which includes an integrated terminal that is connected to an operating server providing a response to a request for a service received from a user terminal through a network. The integrated terminal determines whether to identify vehicle distribution call information by using an operation state of a vehicle and information acquired by associating a boarding location of the user and heading direction information of the vehicle, calculates an operation fee by using GPS information or wheel speed information of the vehicle, and determines whether an output screen of the vehicle is changed through gear state information, wheel speed information, or information received from the ECU of the vehicle.

Another exemplary embodiment of the present disclosure provides a system for providing a taxi service, which includes an integrated terminal that is connected to an operating server providing a response to a request for a service received from a user terminal through a network. The integrated terminal determines whether to identify vehicle distribution call information by using an operation state of a vehicle, and information acquired by associating a boarding location of the user and heading direction information of the vehicle, calculates an operation fee by using GPS information or wheel speed information of the vehicle, determines whether an output screen of the vehicle is changed through gear state information of the vehicle, and determines whether to guide a charging station through battery information of the vehicle.

The integrated terminal may include a vehicle distribution unit receiving the vehicle distribution call information including a boarding location of the user from the operating server, generates heading direction information by receiving the GPS information of the vehicle, determines whether a condition to identify the vehicle distribution call information is satisfied by using boarding location information of the user and the heading direction information of the vehicle, and identifying the vehicle distribution call information when the vehicle distribution call information identification condition is satisfied.

The vehicle distribution unit may determine whether the boarding location of the user is a location at which the user is capable of boarding the vehicle in the heading direction of the vehicle when an operation state of the vehicle is a state in which a passenger does not board the vehicle and a driver waits for providing the taxi service as the vehicle distribution call information identification condition.

The integrated terminal may include a meter unit receiving the wheel speed information of the vehicle, and calculating the operation fee of the vehicle by using the received wheel speed information or GPS information.

The integrated terminal may include a meter unit receiving the wheel speed information of the vehicle, and calculating the operation fee of the vehicle by using the received wheel speed information and GPS information, and the meter unit may start operation fee calculation when receiving information indicating that an alternator is in an on state.

The integrated terminal may include a navigation unit receiving the gear state information, determines whether a condition to change the output screen is satisfied by using the received gear state information, and transmitting output screen change information when the output screen change condition is satisfied.

The navigation unit may determine whether the gear state of the vehicle is stage P indicating a parking or stop state as the output screen change condition.

The navigation unit may include a navigation unit receiving the battery information, determines whether a condition to guide a charging station is satisfied by using the received battery information, and transmitting charging station guide information when the charging station guide condition is satisfied.

The navigation unit may determine whether a battery charging rate of the vehicle is equal to or less than a preset predetermined value as the charging station guide condition.

The integrated terminal may further include an operation record unit receiving motor RPM information and storing the received motor RPM information when the vehicle is driven by a motor.

Yet another exemplary embodiment of the present disclosure provides a system for providing a taxi service, which includes an integrated terminal which transmits and receives information to and from a vehicle, and calculates an operation fee by using at least any one of GPS information, wheel speed information, and alternator information of the vehicle, and determines whether an output screen of the vehicle is changed through gear state information of the vehicle.

Still yet another exemplary embodiment of the present disclosure provides a system for providing a taxi service, which includes an integrated terminal which transmits and receives information to and from a vehicle, and calculates an operation fee by using GPS information, wheel speed information, and of the vehicle, determines whether an output screen of the vehicle is changed through gear state information of the vehicle, and determines whether a charging station is guided through battery information of the vehicle.

Still yet another exemplary embodiment of the present disclosure provides a method for providing a taxi service, which includes determining, by an integrated terminal, whether to identify vehicle distribution call information by using an operation state of a vehicle, and information acquired by associating a boarding location of the user and heading direction information of the vehicle; calculating, by the integrated terminal, an operation fee by using GPS information or wheel speed information of the vehicle; and determining, by the integrated terminal, whether an output screen is changed through gear state information of the vehicle.

Still yet another exemplary embodiment of the present disclosure provides a method for providing a taxi service, which includes determining, by an integrated terminal, whether to identify vehicle distribution call information by using an operation state of a vehicle, and information acquired by associating a boarding location of the user and heading direction information of the vehicle; calculating, by the integrated terminal, an operation fee by using GPS information or wheel speed information of the vehicle; determining, by the integrated terminal, whether an output screen is changed through gear state information of the vehicle; and determining, by the integrated terminal, whether a charging station is guided through battery information of the vehicle.

The determining, by an integrated terminal, of whether to identify vehicle distribution call information by using the boarding location of the user and the heading direction information of the vehicle may include receiving, by the integrated terminal, vehicle distribution call information including the boarding location of the user from an operating server, generating, by the integrated terminal, the heading direction information by using the collected GPS information, determining, by the integrated terminal, of whether a condition to identify the vehicle distribution call information is satisfied by using the boarding location of the user and the heading direction information of the vehicle, and identifying, by the integrated terminal, the vehicle distribution call information when the vehicle distribution call information identification condition is satisfied.

In the determining, by the integrated terminal, of whether a condition to identify the vehicle distribution call information is satisfied by using the boarding location of the user and the heading direction information of the vehicle, the integrated terminal may determine whether the boarding location of the user is a location at which the user is capable of boarding the vehicle in the heading direction of the vehicle when an operation state of the vehicle is a state in which a passenger does not board the vehicle and a driver waits for providing the taxi service as the vehicle distribution call information identification condition.

The calculating, by the integrated terminal, of the operation fee by using the GPS information or wheel speed information of the vehicle may include collecting, by the integrated terminal, the GPS information, receiving, by the integrated terminal, the wheel speed information of the vehicle from a sensor device, and calculating, by the integrated terminal, an operation fee of the vehicle by using the received wheel speed information or the collected GPS information.

The calculating, by the integrated terminal, of the operation fee by using the GPS information or wheel speed information of the vehicle may include collecting, by the integrated terminal, the GPS information, receiving, by the integrated terminal, the wheel speed information of the vehicle from a sensor device, starting, by the integrated terminal, operation fee calculation when receiving information indicating that an alternator is in an on state through the alternator information, and calculating, by the integrated terminal, the operation fee of the vehicle by using the received wheel speed information or the collected GPS information.

The determining, by the integrated terminal, of whether the output screen is changed through the gear state information of the vehicle may include receiving, by the integrated terminal, the gear state information from the sensor device, determining, by the integrated terminal, whether a condition to change an output screen is satisfied by using the received gear state information, and transmitting output screen change information to an input/output unit when the output screen change condition is satisfied.

In the determining, by the integrated terminal, of whether the condition to change the output screen is satisfied by using the received gear state information, the integrated terminal may determine whether the gear state of the vehicle is stage P indicating a parking or stop state as the output screen change condition.

The determining, by the integrated terminal, of whether the charging station is guided through the battery information of the vehicle may include receiving, by the integrated terminal, the battery information from the sensor device, determining, by the integrated terminal, whether a condition to guide the charging station is satisfied by using the received battery information, and transmitting, by the integrated terminal, charging station guide information to the input/output unit when the charging station guide condition is satisfied.

In the determining, by the integrated terminal, of whether the condition to guide the charging station is satisfied by using the received battery information, the integrated terminal may determine whether a battery charging rate of the vehicle is equal to or less than a preset predetermined value as the charging station guide condition.

The method may further include, when the vehicle is driven by a motor, receiving, by the integrated terminal, motor RPM information from the sensor device; and storing, by the integrated terminal, the received motor RPM information as an operation record.

According to exemplary embodiments of the present disclosure, a system and a method for providing a taxi service can be provided, which efficiently and quickly replace vehicle distribution call information between a user and a vehicle driver to achieve the taxi service smoothly.

According to exemplary embodiments of the present disclosure, a system and a method for providing a taxi service can be provided, in which a vehicle makes a U turn by accepting a vehicle distribution call of a passenger located at an opposite side to a vehicle driving direction to prevent a boarding waiting time of the passenger from increasing and a path of the vehicle from being complicated.

According to exemplary embodiments of the present disclosure, a system and a method for providing a taxi service can be provided, which can acquire a value required for calculating an operation fee even in a GPS shading condition such as impossible location recognition due to weather deterioration or an obstacle.

According to exemplary embodiments of the present disclosure, a system and a method for providing a taxi service can be provided, which can achieve safe driving by minimizing distraction of attention of a driver.

According to exemplary embodiments of the present disclosure, a system and a method for providing a taxi service can be provided, which can increase the safety of the vehicle and durability of a battery.

According to exemplary embodiments of the present disclosure, a system and a method for providing a taxi service can be provided, which can store motor RPM information as an operation history by replacing RPM information.

According to exemplary embodiments of the present disclosure, a system and a method for providing a taxi service can be provided, which can simplify a configuration of vehicle hardware, and enhances accuracy of GPS information by using a high-performance vehicle GPS.

DETAILED DESCRIPTION OF ILLUSTRATIVE EMBODIMENTS

Figure 1:
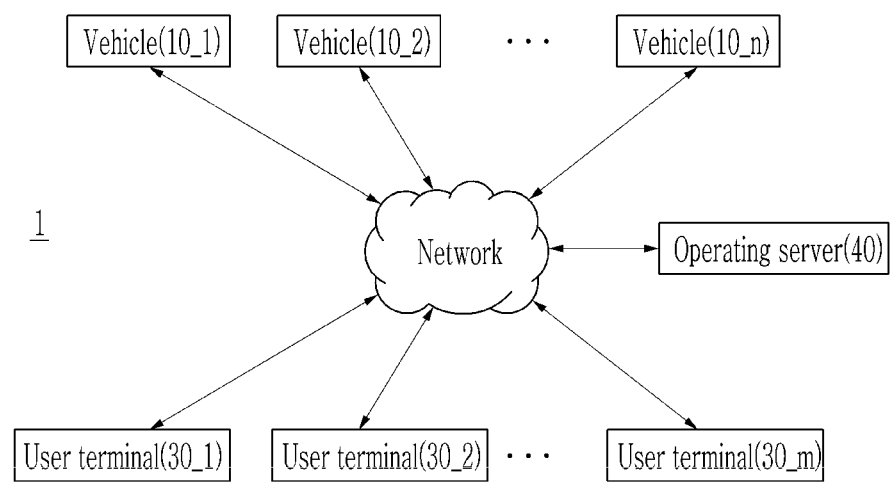
FIG. 1 is a block diagram schematically illustrating a configuration of a system for providing a taxi service according to an exemplary embodiment.

Hereinafter, exemplary embodiments disclosed in this specification will be described in detail with reference to the accompanying drawings and the same or similar components are denoted by the same or similar reference numerals, and duplicated description thereof will be omitted. Suffixes "module" and/or "unit" for components used in the following description are given or mixed in consideration of easy preparation of the present disclosure only and do not have their own distinguished meanings or roles. Further, in describing an embodiment disclosed in the present disclosure, a detailed description of related known technologies will be omitted if it is determined that the detailed description makes the gist of the embodiment of the present disclosure unclear. Further, it is to be understood that the accompanying drawings are just used for easily understanding the exemplary embodiments disclosed in this specification and a technical spirit disclosed in this specification is not limited by the accompanying drawings and all changes, equivalents, or substitutes included in the spirit and the technical scope of the present disclosure are included.

Terms including an ordinary number, such as first and second, are used for describing various elements, but the elements are not limited by the terms. The terms are used only to discriminate one element from another element.

In the present application, it should be understood that term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance.

In a component controlling other components under a specific control condition among components according to an exemplary embodiment, a program implemented by a set of commands materializing a control algorithm required for controlling other components may be installed. The control component may process input information and stored information according to the installed program and generate output information. The control component may include a non-volatile memory storing the program and a memory storing the information.

FIG. 1 is a block diagram schematically illustrating a configuration of a system for providing a taxi service according to an exemplary embodiment.

The taxi service providing system 1 may include a plurality of vehicles 10_1 to 10_n (n is a natural number), a plurality of user terminals 30_1 to 30_m (m is the natural number), and an operating server 40.

As illustrated in FIG. 1, the plurality of vehicles 10_1 to 10_n, the plurality of user terminals 30_1 to 30_m, and the operating server 40 may transmit and receive required information through a network. In this case, the plurality of vehicles 10_1 to 10_n may be a taxi operated by a driver who provides a taxi service. Hereinafter, a taxi refers to all transportation means that provides a service that rides a passenger to a destination and receives a fee therefor.

The operating server 40 may be a server that receives a request for the service from the plurality of user terminals 30_1 to 30_m, provides a response to the received request, and determines a vehicle to perform the service. For example, a user may transmit a vehicle distribution call to a vehicle distribution server through a user terminal 30, the vehicle distribution server may transmit the received vehicle distribution call to the plurality of vehicles 10_1 to 10_n, and perform call vehicle distribution by receiving the response to the vehicle distribution call from the plurality of vehicles 10_1 to 10_n. The vehicle distribution server may determine the call vehicle distribution and transmit information on a distributed vehicle to the user terminal 30. As such, there may be the vehicle distribution server as an example of the operating server 40, and in the following exemplary embodiment, a feature of the operating server 40 as the vehicle distribution server will be described. However, the present disclosure is not limited thereto and different types of servers for providing different services may be the operating server 40.

In the present disclosure, the network may be Personal Area Network (PAN), Local Area Network (LAN), Campus Area Network (CAN), Metropolitan Area Network (MAN), Wide Area Network (WAN), Broadband Network (BBN), wireless LAN (WLAN), Storage Area Network (SAN), and Controller Area Network (CAN), and may also be cellular communication such as Long Term Evolution (LTE), LTE Advanced (LTE-A), Code-Division Multiple Access (CDMA), Wideband Code Division Multiplex Access (WCDMA), Universal Mobile Telecommunication System (UMTS), Wireless Broadband (WiBro), Global System for Mobile Communications (GSM), etc., but is not limited thereto.

Hereinafter, a configuration of a vehicle 10 will be described with reference to FIGS. 2 and 3.

Figure 2:
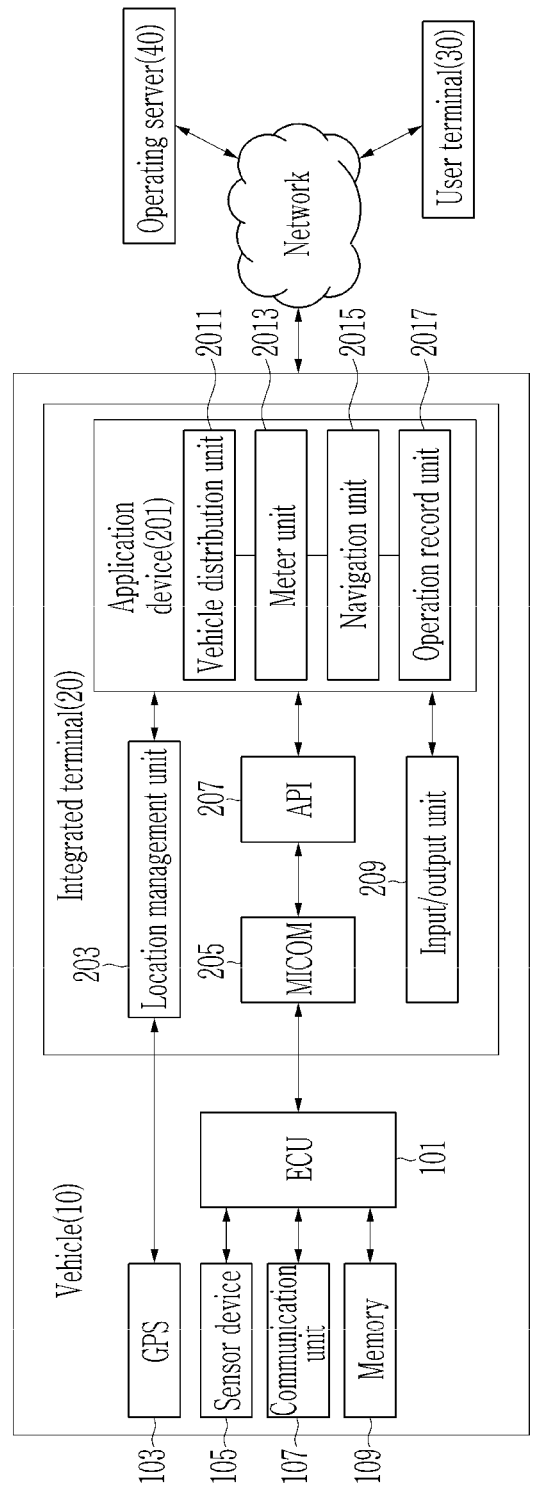
FIG. 2 is a block diagram schematically illustrating the configuration of the system for providing a taxi service according to an exemplary embodiment.

FIG. 2 is a block diagram schematically illustrating a configuration of a system for providing a taxi service according to an exemplary embodiment.

Figure 3:
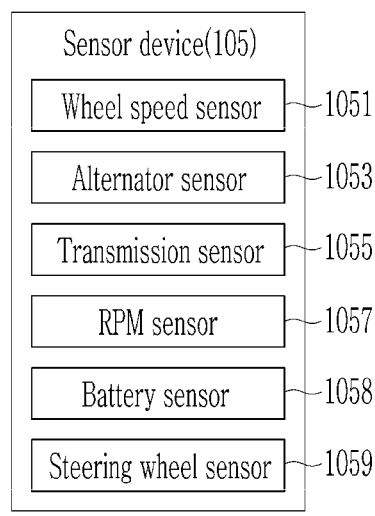
FIG. 3 is a block diagram schematically illustrating the configuration of a sensor device according to an exemplary embodiment.

FIG. 3 is a block diagram schematically illustrating the configuration of a sensor device according to an exemplary embodiment.

In FIG. 2, it is assumed that any one vehicle 10 transmits and receives the required information to and from any one user terminal 30 and the operating server 40 through the network for description.

The vehicle 10 includes an ECU 101, a GPS 103, a sensor device 105, a communication unit 107, a memory 109, and an integrated terminal 20.

The vehicle 10 may be a hybrid car capable of alternately using two types or more power sources such as electricity, an engine, etc., or an electric car using the electricity as the power source.

The electronic control unit (ECU) 101 may process information received from the sensor device 105, and transmit the processed information to the integrated terminal 20.

The global positioning system (GPS) 103 may receive a GPS signal from a satellite, and transmit the received GPS signal to a location management unit 203. The location management unit 203 may generate GPS information including a current location of the vehicle 10 as the unit of a predetermined time based on the received GPS signal.

The sensor device 105 may include a wheel speed sensor, an alternator sensor 1053, a transmission sensor 1055, an RPM sensor 1057, a battery sensor 1058, and a steering wheel sensor 1059.

The wheel speed sensor 1051 may detect a rotation speed of a wheel of the vehicle 10 as the unit of a predetermined time. Wheel speed information detected by the wheel speed sensor 1051 may be matched with time information and stored in the memory 109.

An alternator is a device that supplies power to a vehicle electric system by charging a battery when the engine of the vehicle 10 operates. The alternator sensor 1053 may detect whether the alternator is on/off as the unit of a predetermined time. On/off information of the alternator detected by the alternator sensor 1053 may be matched with the time information and stored in the memory 109.

The transmission sensor 1055 may detect a gear state of the transmission of the vehicle 10 as the unit of a predetermined time. Gear state information detected by the transmission sensor 1055 may be matched with the time information and stored in the memory 109.

When the vehicle is driven by the engine, the RPM sensor 1057 may measure revolutions per minute (RPM) of the engine as the unit of a predetermined time. Further, when the vehicle 10 is driven by a motor, the RPM sensor 1057 may measure motor RPM as the unit of a predetermined time. The engine or motor RPM information measured by the RPM sensor 1057 may be matched with time information and stored in the memory 109.

The battery sensor 1058 may detect the battery state of the vehicle 10 as the unit of a predetermined time. Battery state information detected by the battery sensor 1058 may be matched with the time information and stored in the memory 109. The battery state information may include information on a charging rate, voltage, current, a temperature, a state of charge (SOC), a state of health (SOH), etc., of the battery.

The steering wheel sensor 1059 may detect information on a steering wheel which is a steering device used to change a progress direction of the vehicle by moving the wheel of the vehicle from side to side. Steering wheel information detected by the steering wheel sensor 1059 may be stored in the memory 109. The steering wheel information may include information on a movement degree of the steering wheel, whether a call button and a call end button in the steering wheel are input, etc.

The communication unit 107 may transmit a control command of the ECU 101 or the information stored in the memory 109 to the outside, and transfer the information received from the outside to the ECU 101.

The memory 109 may store information required for each component of the vehicle 10 to operate.

The integrated terminal 20 may include an application device 201, a location management unit 203, a MICOM 205, an API 207, and an input/output unit 209.

The application device 201 may include a vehicle distribution unit 2011, a meter unit 2013, a navigation unit 2015, and an operation record unit 2017.

The application device 201 may receive the information collected by the location management unit 203 or the sensor device 105, and generate and transmit vehicle distribution call information, operation fee information, navigation output screen change information, or charging station guide information by using the received information. In the exemplary embodiment, each of the vehicle distribution unit 2011, the navigation unit 2015, the meter unit 2013, and the operation record unit 2017 as an application for performing a unique function may process allocated information and display a processing result in the input/output unit 209. Some applications may transmit the processing result to the MICOM 205 so as to transmit the processing result to the operating server 40. The MICOM 205 may allow the ECU 101 to transmit the processing result to the operating server 40 or directly transmit the processing result to the operating server 40 through the communication unit 107.

The vehicle distribution unit 2011 may receive the vehicle distribution call information, and determine whether to provide the vehicle distribution call information to a driver according to a result of comparing the GPS information of the user terminal 30 and heading direction information of the vehicle 10. Hereinafter, whether to provide the vehicle distribution call information to the driver is defined as identifying the vehicle distribution call information. The vehicle distribution call information may be transmitted from the operating server 40 to the vehicle distribution unit 2011 through the communication unit 107 of the vehicle 10 and the MICOM 205 of the integrated terminal 20.

When a boarding location of the user is a location at which the user is capable of boarding the vehicle 10 in the heading direction of the vehicle 10, the vehicle distribution unit 2011 determines that the received vehicle distribution call information is identified and transmits the vehicle distribution call information to the input/output unit 209, to allow the input/output unit 209 to output a screen including the vehicle distribution call information. The vehicle distribution unit 2011 may determine the heading direction which is a direction which the vehicle heads through the GPS information received by the location management unit 203.

The driver may input a response to contents of accepting and rejecting a vehicle distribution request through the input/output unit 209 and the input/output unit 209 may generate vehicle distribution call response information according to an input of the driver and transmit the generated vehicle distribution call response information to the vehicle distribution unit 2011. The vehicle distribution unit 2011 may transmit the vehicle distribution call response information to the MICOM 205 so as to transmit the vehicle distribution call response information to the operating server 40.

The meter unit 2013 may calculate the operation fee of the vehicle 10 by using the GPS information collected by the location management unit 203 or the wheel speed information and the alternator information collected by the sensor device 105. The meter unit 2013 has an effect of being capable of performing more accurate fee calculation through a relatively high-performance GPS by using the GPS 103 of the vehicle 10 other than the GPS of the user terminal 30.

The navigation unit 2015 may perform a general navigation function. For example, the navigation unit 2015 may search a path from a departure to a destination, and display the current location of the vehicle 10 and the location of the user terminal 30 in the searched path. For example, the navigation unit 2015 compares the GPS information of the user terminal 30 and the heading direction information of the vehicle 10 and when the location of the user terminal 30 is the location at which the user is capable of boarding the vehicle 10 in the heading direction of the vehicle 10, the navigation unit 2015 may display the location of the user terminal 30 on the searched path through the input/output unit 209.

The navigation unit 2015 determines that the navigation output screen of the vehicle 10 is changed when a gear is at stage P indicating a parking or stop state by using the gear state information, and transmits output screen change information to the input/output unit 209 to allow the input/output unit 209 to output the changed screen. Further, the navigation unit 2015 determines that the charging station guide information is output onto the navigation output screen of the vehicle 10 when the battery charging rate is equal to or less than a preset predetermined value by using the battery information, and transmits the charging station guide information to the input/output unit 209 to allow the input/output unit 209 to output a charging station guide screen.

The operation record unit 2017 may record operation information such as the speed, the location, the RPM, etc., of the vehicle 10 by using the GPS information collected by the location management unit 203 or the RPM information collected by the sensor device 105. The operation record unit 2017 may include a digital Tacho graph (DTG).

When the vehicle 10 is driven by the motor, the operation record unit 2017 may store the motor RPM information received from the sensor device 105 by replacing the RPM information. Through this, when the vehicle is driven by the motor, there is an effect that the motor RPM information may be stored as the operation record by replacing the RPM information.

The location management unit 203 may generate the GPS information including the location of the current vehicle 10 by processing the GPS signal received from the GPS 103.

The microcomputer (MICOM) 205 may transfer the information received from the ECU 101 to the application device 201 through the API 207. In this case, the MICOM may control the API 207 to transmit the information received from the ECU 101 to a corresponding application. The ECU 101 may transmit the information collected by the sensor device 105 to the MICOM 205 through CAN communication, and the MICOM 205 may transmit the collected information to the corresponding application in the application device 201 through the API 207. That is, the MICOM 205 may classify the received information and allocate the classified information to an application for processing the received information through the API 207.

The application programming interface (API) 207 may perform communication between the ECU 101 and the application device 201. For example, the ECU 101 may transmit the information collected by the sensor device 105 to the application device 201 through the API 207.

The input/output unit 209 may generate input information for controlling the operation of the integrated terminal 20, and output an audio signal (or a signal related to hearing), a video signal (or a signal related to vision), or an alarm signal or a signal related to tactics. For example, the input/output unit 209 may be a touch display, etc.

The user terminal 30 may be a mobile terminal such as a cellular phone, a smart phone, a notebook computer, etc. The user may be a passenger using the taxi service.

In the following description, transmitting and receiving information to and from the operating server 40 by a component implemented by one application of the application device 201 may be performed through the communication unit 107 of the vehicle 10. That is, the information received from the operating server 40 to the communication unit 107 may be transferred to the corresponding application through the ECU 101, the MICOM 205, and the API 207, and the information generated by the application may be transmitted to the operating server 40 through the API 207, the MICOM 205, the ECU 101, and the communication unit 107. However, the present disclosure is not limited thereto, and direct communication between the application device 201 and the communication unit 107 may be possible.

Figure 4:
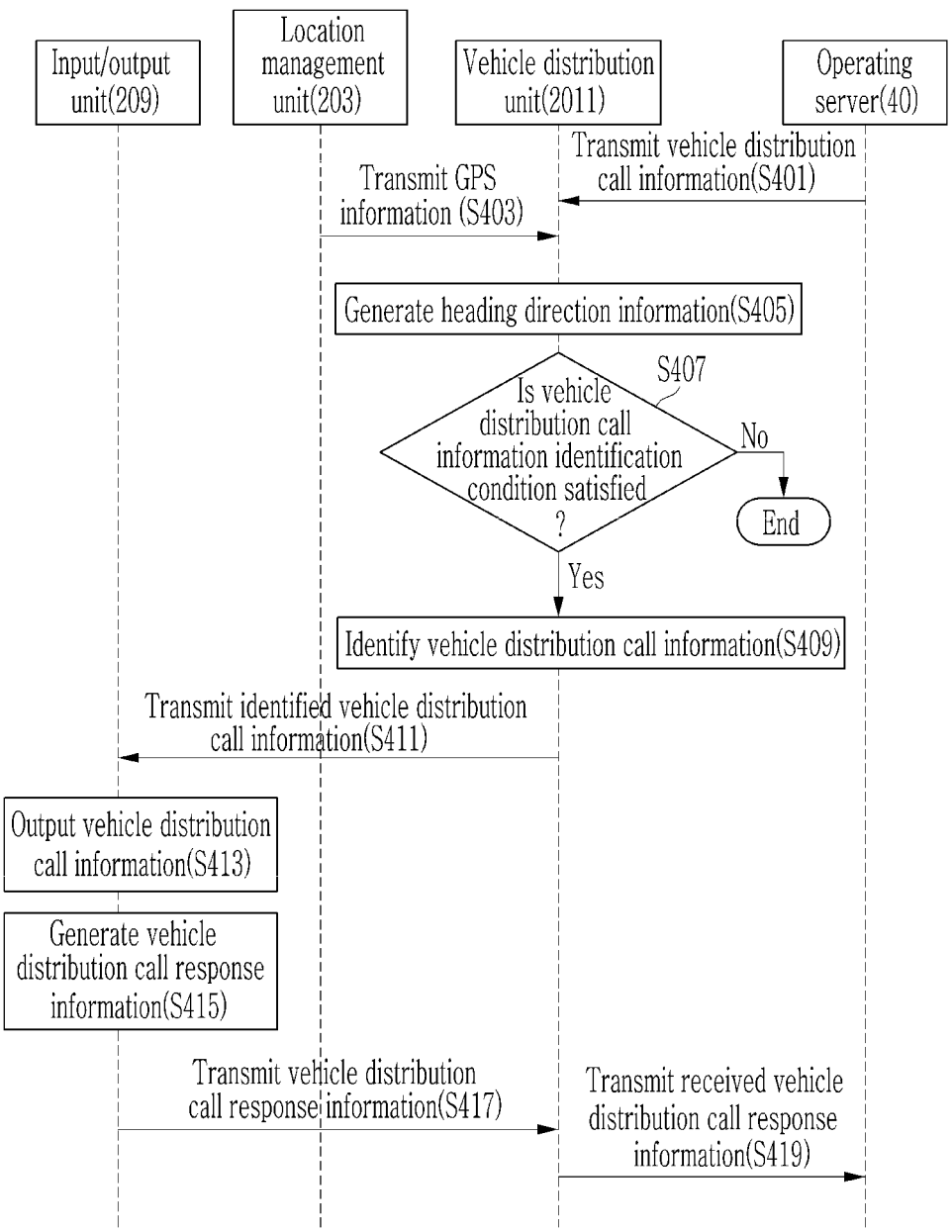
FIG. 4 is a flowchart of a method for identifying vehicle distribution call information according to an exemplary embodiment.

FIG. 4 is a flowchart of a method for identifying vehicle distribution call information according to an exemplary embodiment.

The operating server 40 transmits vehicle distribution call information to the vehicle distribution unit 2011 (S401).

For example, the user terminal 30 may transmit the vehicle distribution call information to the operating server 40. The vehicle distribution call information may include information on a vehicle distribution request of the user terminal 30, a current location of the user terminal 30, a destination, a boarding location, a departure time, etc. The boarding location as a location at which the user intends to board the vehicle 10 may be a departure location. When the user waits at the boarding location, the boarding location may match the location of the user terminal 30.

The operating server 40 may receive the vehicle distribution call information from the user terminal 30, and transmit the vehicle distribution call information to a plurality of vehicles 10_1 to 10_n. The communication unit 107 of any one vehicle 10 receives the vehicle distribution call information and transmits the vehicle distribution call information to the ECU 101. The vehicle distribution unit 2011 may receive the vehicle distribution call information through the ECU 101 and the MICOM 205. The vehicle distribution call information may be allocated and processed to the vehicle distribution unit 2011.

The location management unit 203 transmits GPS information to the vehicle distribution unit 2011 as the unit of a predetermined time (S403).

The vehicle distribution unit 2011 generates heading direction information of the vehicle 10 by using the received GPS information (S405).

The vehicle distribution unit 2011 determines whether a condition to identify the received vehicle distribution call information is satisfied, otherwise, a procedure is terminated (S407).

When the vehicle distribution unit 2011 determines that the condition to identify the received vehicle distribution call information is satisfied, the vehicle distribution unit 2011 identifies the vehicle distribution call information (S409).

Figure 5:
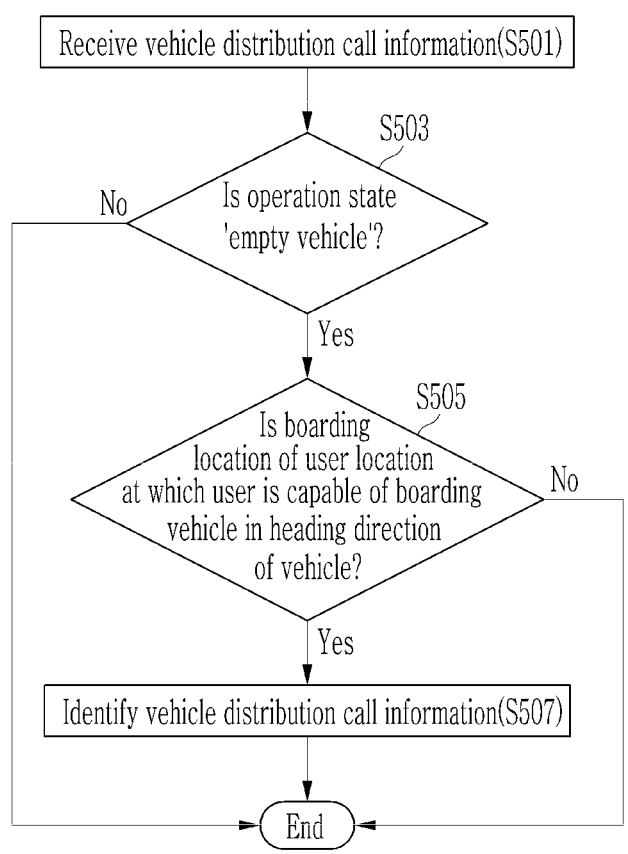
FIG. 5 is a flowchart for describing steps of FIG. 4.

FIG. 5 is a flowchart for describing steps S407 and S409.

When the vehicle distribution unit 2011 receives the vehicle distribution call information from the MICOM 205 (S501), the vehicle distribution unit 2011 determines whether an operation state of the vehicle 10 is 'empty vehicle', otherwise, the procedure is terminated (S503).

For example, the operation state of the vehicle 10 may be divided into 'driving' or 'empty vehicle'. The 'driving' state means a state in which the passenger boards the vehicle 10 and the driver provides the taxi service. The 'empty vehicle' state means a state in which as the passenger does not board the vehicle 10, the driver waits for providing the taxi service. The driver of the vehicle 10 may input the driving state through the input/output unit 209 and the input/output unit 209 may transmit input operation state information to the vehicle distribution unit 2011. The vehicle distribution unit 2011 may determine whether the operation state of the vehicle is 'empty vehicle' through the received operation state information, and when the vehicle operation state is not 'empty vehicle' according to a determination result, the procedure may be terminated.

When the operation state of the vehicle 10 is 'empty vehicle', the vehicle distribution unit 2011 determines whether the boarding location of the user is a location at which the user is capable of boarding the vehicle 10 in the heading direction of the vehicle 10, otherwise, the procedure is terminated (S505).

For example, the vehicle distribution unit 2011 compares the GPS information received from the user terminal 30 and the heading direction information, and when the vehicle distribution unit 2011 determines that the boarding location of the user is located at a right side of the heading direction of the vehicle 10, the vehicle distribution unit 2011 may determine that the boarding location of the user is the location at which the user is capable of boarding the vehicle 10 in the heading direction of the vehicle 10. Further, when the vehicle distribution unit 2011 determines that the boarding location of the user is not the location at which the user is capable of boarding the vehicle 10 in the heading direction of the vehicle 10 according to the determination result, the procedure may be terminated.

When the boarding location of the user is the location at which the user is capable of boarding the vehicle 10 in the heading direction of the vehicle 10, the vehicle distribution unit 2011 identifies the vehicle distribution call information (S507).

After identifying the vehicle distribution call information, the vehicle distribution unit 2011 transmits the identified vehicle distribution call information to the input/output unit 209 (S411).

The input/output unit 209 receives the vehicle distribution call information and outputs the vehicle distribution call information (S413).

The input/output unit 209 generates vehicle distribution call response information according to an input of the driver (S415).

The input/output unit 209 transmits the generated vehicle distribution call response information to the vehicle distribution unit 2011 (S411), and the vehicle distribution unit 2011 transmits the received vehicle distribution call response information to the operating server 40 (S419).

For example, the vehicle distribution unit 2011 may identify the vehicle distribution call information, and then transmit the identified vehicle distribution call information to the input/output unit 209, and the input/output unit 209 may output the received vehicle distribution call information. The driver of the vehicle 10 may identify the vehicle distribution call information through the output screen, and input a response of contents of accepting or rejecting the vehicle distribution call through the input/output unit 209. The input/output unit 209 may generate the vehicle distribution call response information according to the input of the driver, and transmit the vehicle distribution call response information generated by the input/output unit 209 to the vehicle distribution unit 2011.

The vehicle distribution call response information may include vehicle and drive information when the driver accepts the vehicle distribution call. Further, the vehicle distribution call response information may include a message of rejecting the vehicle distribution call when the driver rejects the vehicle distribution call. When the driver accepts the vehicle distribution call, the vehicle distribution unit 2011 may request the MICOM 205 to transmit the vehicle distribution call response information including the vehicle and driver information to the operating server 40.

The MICOM 205 may allow the ECU 101 to transmit the vehicle distribution call response information to the operating server 40 or directly transmit the processing result to the operating server 40 through the communication unit 107. Further, here, the driver of the vehicle 10 may input a response of contents of accepting the vehicle distribution call through the call button of the steering wheel or input a response of contents of rejecting the vehicle distribution call through the call end button. The steering wheel sensor 1059 may generate the steering wheel information by detecting the input of the driver, and the ECU 101 may transmit the steering wheel information received from the steering wheel sensor 1059 to the vehicle distribution unit 2011.

As described above, whether to transmit the vehicle distribution call information is determined by considering the operation state of the vehicle to efficiently and quickly replace the vehicle distribution call information between the user and the vehicle driver, thereby smoothly achieving the taxi service.

Further, as described above, whether to transmit the vehicle distribution call information is determined by considering the boarding location of the user and the heading direction of the vehicle to accept the vehicle distribution call of the passenger located at the opposite side to the driving direction of the vehicle, and as a result, the vehicle makes a U-turn, thereby preventing the boarding waiting time of the passenger from being increased and the path of the vehicle from being complicated.

Figure 6:
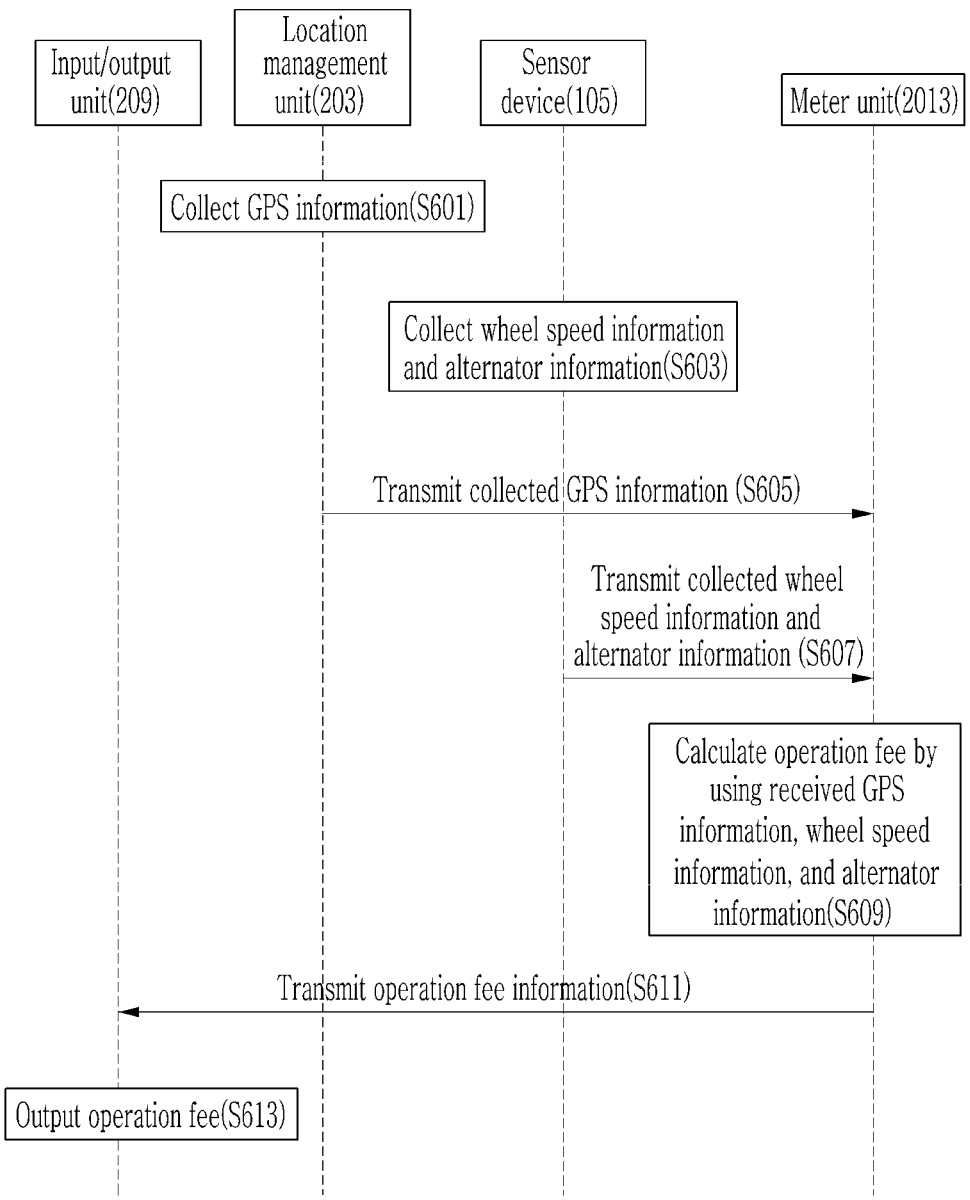
FIG. 6 is a flowchart of a method for calculating an operation fee according to an exemplary embodiment.

FIG. 6 is a flowchart of a method for calculating an operation fee according to an exemplary embodiment.

A location management unit 203 collects GPS information (S601).

A sensor device 105 collects wheel speed information and alternator information (S603).

For example, the location management unit 203 may collect the GPS information generated as the unit of a predetermined time for a current location of a vehicle 10, a wheel speed sensor 1051 may collect wheel speed information of the vehicle 10, and an alternator sensor 1053 may collect on/off information of an alternator.

The location management unit 203 transmits the GPS information collected as the unit of a predetermined time to the meter unit 2013 (S605).

The sensor device 105 transmits the collected wheel speed information and alternator information to the meter unit 2013 (S607).

For example, the location management unit 203 may transmit the collected GPS information to the meter unit 2013, and the sensor device 105 may transmit the collected wheel speed information and alternator information to the meter unit 2013 through the ECU 101 and the MICOM 205.

The meter unit 2013 calculates an operation fee by using the received GPS information, wheel speed information, and alternator information (S609).

For example, the meter unit 2013 may recognize a case of receiving information indicating that an alternator is in an on state from the sensor device 105 as a start condition of fee calculation. In other words, the meter unit 2013 may not start a fee calculation procedure in a case of receiving information indicating that the alternator is in an off state from the sensor device 105.

As another example, the meter unit 2013 may calculate the operation fee by determining an operation distance based on the GPS information received from the location management unit 203. In this case, the meter unit 2013 may calculate the operation fee by determining the operation distance through wheel speed information received from the sensor device 105 with respect to a GPS shading section in which it is difficult to receive the GPS information due to weather deterioration or an obstacle.

The meter unit 2013 calculates the operation fee, and then transmits operation fee information including the operation fee calculated by the input/output unit 209 (S611), and the input/output unit 209 outputs the received operation fee (S613).

As described above, the operation fee is calculated by using the information received from the GPS or the sensor device of the vehicle to obtain a value required for calculating the operation fee even in the GPS shading condition such as impossible location recognition due to the weather deterioration or the obstacle.

Figure 7:
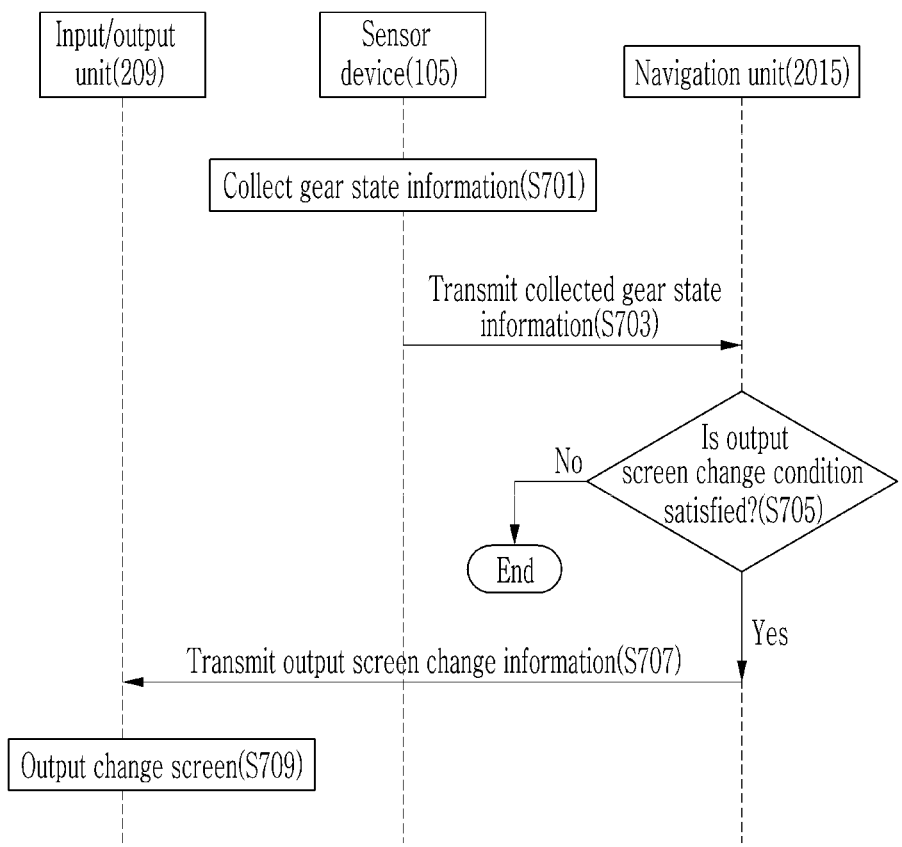
FIG. 7 is a flowchart of a method for providing a navigation screen according to an exemplary embodiment.

FIG. 7 is a flowchart of a method for providing a navigation screen according to an exemplary embodiment.

The sensor device 105 collects gear state information (S701).

For example, the transmission sensor 1055 may collect the gear state information. The gear state information may include information indicating whether a gear corresponds to P (Parking), R (Reverse), N (Neutral), D (Drive), or any stage.

The sensor device 105 transmits the collected gear state information to the navigation unit 2015 (S703).

For example, the sensor device 105 may transmit the collected gear state information to the navigation unit 2015 through the ECU 101 and the MICOM 205.

The navigation unit 2015 determines whether a condition to change the output screen of the vehicle 10 is satisfied, otherwise, the procedure is terminated (S705).

When the navigation unit 2015 determines that the condition to change the output screen of the vehicle 10 is satisfied, the navigation unit 2015 transmits output screen change information to the input/output unit 209 (S707).

For example, the navigation unit 2015 may determine whether the gear state of the vehicle 10 is stage P indicating a parking or stop state as the output screen change condition through the received gear state information. When the navigation unit 2015 determines that the gear state of the vehicle 10 is stage P indicating a parking or stop state, the navigation unit 2015 may transmit the output screen change information to the input/output unit 209. Here, the output screen change information may include contents of controlling the input/output unit 209 so as to prevent wave flow processing of information such as turn by turn (TBT) screen-in primary point of interest (POI) or a current location address. TBT means a function of continuously displaying a direction for a selected path in the form of voice or visual instructions. POI means an interested point such as a building or a shop on a map. In addition, the navigation unit 2015 may determine whether the condition to change the output screen of the vehicle 10 is satisfied based on not only gear state information, but also wheel speed information received from the sensor device 105 or information received from the ECU 101.

The input/output unit 209 outputs the changed screen according to the received output screen change information (S709).

As described above, the output screen of the vehicle is changed by considering the gear state of the vehicle to minimize attention distribution of the driver, thereby achieving safe driving.

Figure 8:
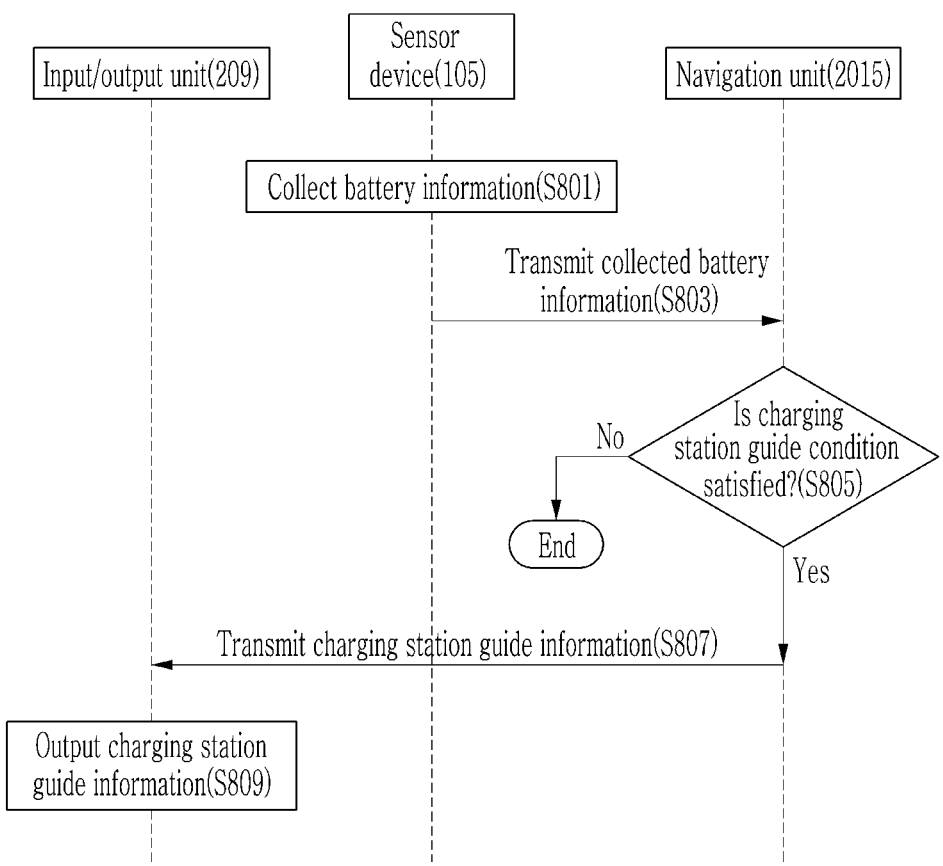
FIG. 8 is a flowchart of a method for providing a navigation screen according to an exemplary embodiment.

FIG. 8 is a flowchart of a method for providing a navigation screen according to an exemplary embodiment.

The sensor device 105 collects battery information (S801).

For example, a battery sensor 1058 may collect the battery information. The battery information may include information on a battery charging rate.

The sensor device 105 transmits the collected battery information to the navigation unit 2015 (S803).

For example, the sensor device 105 may transmit the collected battery information to the navigation unit 2015 through the ECU 101 and the MICOM 205.

The navigation unit 2015 determines whether a condition to guide a charging station to the vehicle 10 is satisfied, otherwise, the procedure is terminated (S805).

When the navigation unit 2015 determines that the condition to guide a charging station to the vehicle 10 is satisfied, the navigation unit 2015 transmits charging station guide information to the vehicle 10 (S807).

For example, the navigation unit 2015 may determine whether the battery charging rate of the vehicle 10 is equal to or less than a preset predetermined value as the charging station guide condition through the received battery information. When the navigation unit 2015 determines that the battery charging rate of the vehicle 10 is equal to or less than the preset predetermined value, the navigation unit 2015 may transmit the charging station guide information to the input/output unit 209. Here, the charging station guide information may include contents for proposing that the vehicle 10 detours the charging station or guiding an addition path so as to set a charging station close to a current location as a destination.

The input/output unit 209 outputs the received charging station guide information (S809).

As described above, the additional path is guided by considering a battery charging state of the vehicle to increase the safety of the vehicle and the durability of the battery.

Figure 9:
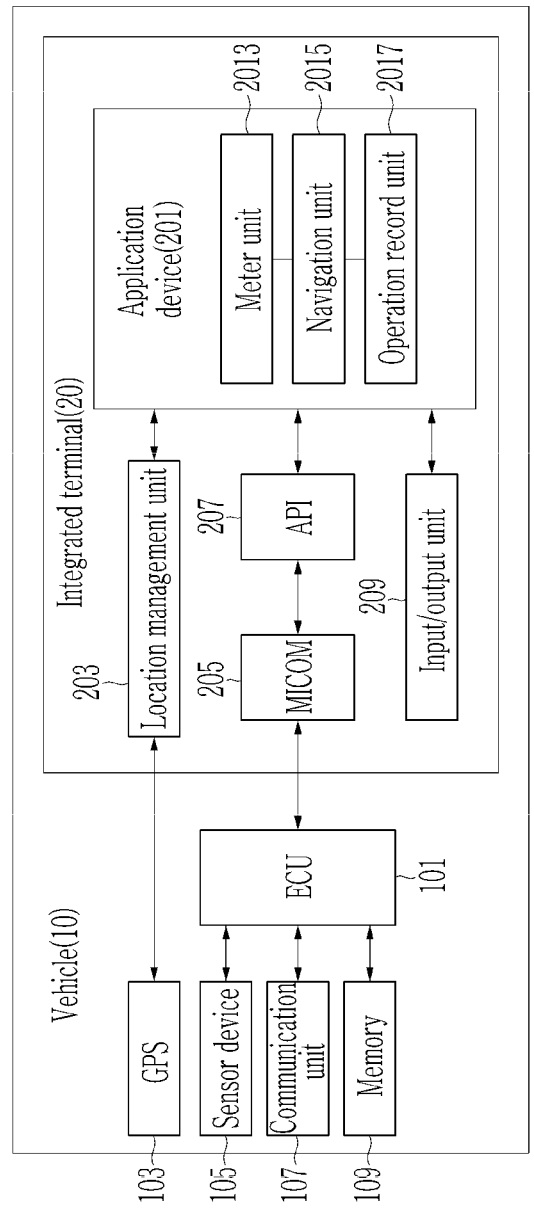
FIG. 9 is a block diagram schematically illustrating a configuration of a system for providing a taxi service according to another exemplary embodiment.

FIG. 9 is a block diagram schematically illustrating a configuration of a system for providing a taxi service according to another exemplary embodiment.

As described above, the vehicle 10 includes the ECU 101, the GPS 103, the sensor device 105, the communication unit 107, the memory 109, and the integrated terminal 20. The sensor device 105 may include a wheel speed sensor, an alternator sensor 1053, a transmission sensor 1055, an RPM sensor 1057, a battery sensor 1058, and a steering wheel sensor 1059. The integrated terminal 20 may include an application device 201, a location management unit 203, a MICOM 205, an API 207, and an input/output unit 209. The application device 201 may include the meter unit 2013, the navigation unit 2015, and the operation record unit 2017.

As described above, the integrated terminal 20 may transmit and receive the wheel speed information and the alternator information to and from the vehicle 10 through the ECU 101, the MICOM 205, and the API 207. Further, the integrated terminal 20 may receive the GPS information which the GPS 103 of the vehicle 10 collects through the location management unit 203. As in FIG. 6, the meter unit 2013 may calculate the operation fee of the vehicle 10 by selectively using the wheel speed information, the alternator information, and the GPS information, and transmit the operation fee information to the input/output unit 209.

Further, as described above, the integrated terminal 20 may receive the gear state information of the vehicle 10 through the ECU 101, the MICOM 205, and the API 207. As in FIG. 7 the navigation unit 2015 may determine whether the output screen change condition is satisfied by using the gear state information, and when the condition is satisfied, the navigation unit 2015 may transmit the output screen change information to the input/output unit 209. The integrated terminal 20 may receive the battery information of the vehicle 10 through the ECU 101, the MICOM 205, and the API 207. As in FIG. 8 the navigation unit 2015 may determine whether the charging station guide condition is satisfied by using the battery information, and when the charging station guide condition is satisfied, the navigation unit 2015 may transmit the charging station guide information to the input/output unit 209.

As described above, the integrated terminal for providing the taxi service is included in the vehicle to simplify the configuration of the hardware.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A system for providing a taxi service, the system comprising:
   an integrated terminal configured to communicate with an operating server that provides a response to a request for a service received from a user terminal through a network, wherein the integrated terminal comprises a vehicle distribution unit, a meter unit, and a navigation unit, and is configured to:
   determine, by the vehicle distribution unit, whether to identify vehicle distribution call information by using an operation state of a vehicle and information acquired by associating a boarding location of the user terminal and heading direction information of the vehicle, wherein the heading direction information of the vehicle comprises a heading direction;
   calculate, by the meter unit, an operation fee by using GPS information or wheel speed information of the vehicle; and
   determine, by the navigation unit, whether an output screen of the vehicle is changed based on gear state information comprising a gear state, the wheel speed information, or information received from an electronic control unit (ECU) of the vehicle,
   wherein:
   the vehicle distribution unit is an application for performing a function determining the operation state of the vehicle installed in hardware in the vehicle,
   the meter unit is an application for performing a calculating function installed in the hardware in the vehicle, and
   the navigation unit is an application for performing a function searching a path from a departure to a destination installed in the hardware in the vehicle,
   wherein:
   the meter unit is configured to:
   receive the wheel speed information of the vehicle;
   calculate the operation fee of the vehicle by using the received wheel speed information and GPS information; and
   start operation fee calculation when receiving information indicating that an alternator is in an on state,
   wherein the vehicle distribution unit is configured to:
   receive the vehicle distribution call information including the boarding location of the user terminal through the ECU of the vehicle from the operating server;
   generate the heading direction information by receiving the GPS information of the vehicle;
   determine whether a condition to identify the vehicle distribution call information is satisfied by using boarding location information of the user terminal and the heading direction information of the vehicle; and
   identify the vehicle distribution call information when the vehicle distribution call information identification condition is satisfied, and
   wherein:
   the vehicle distribution unit determines whether an operation state of the vehicle is a state in which a passenger does not board the vehicle and a driver waits for providing the taxi service as the vehicle distribution call information identification condition, and
   the vehicle distribution unit determines that the boarding location of the user terminal is located at a side of the heading direction of the vehicle by comparing GPS information received from the user terminal and the heading direction information.

2. The system of claim 1, wherein the meter unit is further configured to receive the wheel speed information of the vehicle and calculate the operation fee of the vehicle by using the received wheel speed information or the GPS information.

3. The system of claim 1, wherein the navigation unit is configured to:
   receive the gear state information;

determine whether a condition to change the output screen is satisfied by using the received gear state information; and transmit output screen change information when the condition to change the output screen is satisfied.

4. The system of claim 3, wherein the navigation unit is further configured to determine whether the gear state of the vehicle is stage P indicating a parking or stop state as the condition to change the output screen.

5. A method for providing a taxi service, the method comprising:
determining, by a vehicle distribution unit, whether to identify vehicle distribution call information by using an operation state of a vehicle and information acquired by associating a boarding location of a user terminal and heading direction information of the vehicle, wherein the heading direction information of the vehicle comprises a heading direction;
calculating, by a meter unit, an operation fee by using GPS information or wheel speed information of the vehicle; and
determining, by a navigation unit, whether an output screen is changed based on gear state information of the vehicle, wherein the gear state information comprises a gear state;
wherein:
the steps of determining whether to identify the vehicle distribution call information, calculating the operation fee, and determining whether the output screen is changed are performed by hardware in the vehicle,
wherein:
the vehicle distribution unit is an application for performing a function determining the operation state of the vehicle installed in hardware in the vehicle,
the meter unit is an application for performing a calculating function installed in the hardware in the vehicle, and
the navigation unit is an application for performing a function searching a path from a departure to a destination installed in the hardware in the vehicle,
wherein:
calculating, by the meter unit, the operation fee by using the GPS information or the wheel speed information of the vehicle comprises:
collecting the GPS information;
receiving the wheel speed information of the vehicle from a sensor device;
starting an operation fee calculation after receiving alternator information indicating that an alternator is in an on state through the alternator information; and
calculating the operation fee of the vehicle by using the received wheel speed information or the collected GPS information, and wherein determining whether to identify vehicle distribution call information comprises:
receiving vehicle distribution call information including the boarding location of the user terminal through an Electronic Control Unit (ECU) of the vehicle from an operating server;
generating the heading direction information by using the GPS information of the vehicle;
determining whether the boarding location of the user terminal is a location at which the user terminal is capable of boarding the vehicle in the heading direction of the vehicle when an operation state of the vehicle is a state in which a passenger does not board the vehicle and a driver waits for providing the taxi service as a condition to identify the vehicle distribution call information by using the boarding location of the user terminal and the heading direction information of the vehicle; and
identifying the vehicle distribution call information when the vehicle distribution call information identification condition is satisfied, and
wherein determining whether the boarding location of the user terminal is a location at which the user terminal is capable of boarding the vehicle in the heading direction of the vehicle comprises:
determining, by the vehicle distribution unit, that the boarding location of the user terminal is located at a side of the heading direction of the vehicle comparing GPS information received from the user terminal and the heading direction information.

6. The method of claim 5, wherein calculating the operation fee by using the GPS information or the wheel speed information of the vehicle comprises:
collecting the GPS information;
receiving the wheel speed information of the vehicle from the sensor device; and
calculating the operation fee of the vehicle by using the received wheel speed information or the collected GPS information.

7. The method of claim 5, wherein determining whether the output screen is changed based on the gear state information of the vehicle comprises:
receiving the gear state information from a second sensor device;
determining whether the gear state of the vehicle is stage P indicating a parking or stop state as a condition to change the output screen by using the received gear state information; and
transmitting output screen change information to an input/output unit when the condition to change the output screen is satisfied.

* * * * *